(12) United States Patent
La Porta et al.

(10) Patent No.: US 12,451,251 B2
(45) Date of Patent: Oct. 21, 2025

(54) METHOD FOR DETERMINING A LONG-TERM SURVIVAL PROGNOSIS OF BREAST CANCER PATIENTS, BASED ON ALGORITHMS MODELLING BIOLOGICAL NETWORKS

(71) Applicant: COMPLEXDATA S.R.L., Milan (IT)

(72) Inventors: Caterina Anna Maria La Porta, Milan (IT); Stefano Zapperi, Milan (IT); Francesc Font Clos, Milan (IT)

(73) Assignee: COMPLEXDATA S.R.L., Milan (IT)

( * ) Notice: Subject to any disclaimer, the term of this patent is extended or adjusted under 35 U.S.C. 154(b) by 192 days.

(21) Appl. No.: 17/773,263

(22) PCT Filed: Nov. 23, 2020

(86) PCT No.: PCT/IB2020/061014
§ 371 (c)(1),
(2) Date: Apr. 29, 2022

(87) PCT Pub. No.: WO2021/140373
PCT Pub. Date: Jul. 15, 2021

(65) Prior Publication Data
US 2023/0145332 A1 May 11, 2023

(30) Foreign Application Priority Data
Dec. 13, 2019 (IT) .................. 102019000023946

(51) Int. Cl.
*G16H 50/20* (2018.01)
*G16B 5/00* (2019.01)
(Continued)

(52) U.S. Cl.
CPC .............. *G16H 50/20* (2018.01); *G16B 5/00* (2019.02); *G16B 40/00* (2019.02); *G16H 50/30* (2018.01); *G16H 50/50* (2018.01)

(58) Field of Classification Search
CPC ........ G16H 50/20; G16H 50/50; G16H 50/30; G16H 20/10; G16B 5/00; G06F 18/2135
See application file for complete search history.

(56) References Cited

U.S. PATENT DOCUMENTS

| 11,091,809 B2 * | 8/2021 | Harkin ................... G16B 25/00 |
| 2015/0331992 A1 * | 11/2015 | Arnon Jerby .......... A61K 31/55 514/217 |

(Continued)

FOREIGN PATENT DOCUMENTS

| WO | WO-2008100352 A2 * | 8/2008 | ........... C07K 14/415 |
| WO | WO-2010104472 A1 * | 9/2010 | ....... G01N 33/57415 |

(Continued)

OTHER PUBLICATIONS

Al-Ejeh et al., "Meta-analysis of the global gene expression profile of triple-negative breast cancer identifies genes for the prognostication and treatment of aggressive breast cancer," Oncogenesis (2014) 3, e100; doi:10.1038/oncsis.2014.14. (Year: 2014).*

(Continued)

Primary Examiner — Jonathon A. Szumny
(74) Attorney, Agent, or Firm — Armstrong Teasdale LLP

(57) ABSTRACT

A method is described for determining a survival prognosis of a patient suffering from a breast tumor, using processing carried out by electronic processing and/or calculation means. The method first comprises step (a) of defining a biological network representative of a particular biological process associated with the breast tumor. The biological network comprises a plurality of nodes, a set of directional relationships between these nodes and a set of genes associated with these nodes. The method also includes step (b) of accessing a data set related to the patient, comprising gene expressions in a biological sample of the tumor isolated (Continued)

from the patient; and step (c) of calculating a continuous expression value for the aforesaid nodes of the biological network. If the node is associated with only one gene and it is found that the gene is present in the biological sample, the continuous expression value of the node is calculated as the expression of the associated gene detected in the biological sample. If the node is associated with multiple genes, and it is found that at least one of the aforesaid genes is present in the biological sample, the continuous expression value of the node is calculated based on the expressions of the associated genes, present in the biological sample. If the node is not associated with any gene, or the associated gene is not found in the biological sample, the node is marked as a node not associated with a continuous expression value. The method then comprises the following steps, carried out by the electronic processing and/or calculation means: (d) binarizing the data set of continuous expression values calculated for each node of the biological network to which a continuous expression value is associated, based on a comparison of the continuous expression value with a respective threshold, to thus obtain a first binarized data set of the nodes, obtained based on the detections made; (e) calculating an aggressiveness score based on the aforesaid first binarized data set of the nodes; and finally (f) determining a survival prognosis result based on the aforesaid aggressiveness score calculated.

17 Claims, 3 Drawing Sheets

(51) Int. Cl.
*G16B 40/00* (2019.01)
*G16H 50/30* (2018.01)
*G16H 50/50* (2018.01)

(56) References Cited

U.S. PATENT DOCUMENTS

| | | | | |
|---|---|---|---|---|
| 2016/0078167 A1* | 3/2016 | Rosner | ............... | A61K 31/405 514/263.34 |
| 2016/0110496 A1* | 4/2016 | Taylor | ............... | G16B 40/00 702/19 |
| 2018/0320237 A1* | 11/2018 | Snijders | ............... | C12Q 1/6886 |
| 2019/0279769 A1* | 9/2019 | Conzen | ............... | G16H 20/40 |

FOREIGN PATENT DOCUMENTS

| | | | | |
|---|---|---|---|---|
| WO | WO-2013147330 A1 * | 10/2013 | ............ | C12Q 1/68 |
| WO | 2019178217 A1 | 9/2019 | | |
| WO | WO-2019233028 A1 * | 12/2019 | ............ | C12Q 1/6886 |

OTHER PUBLICATIONS

Guo et al., "Application of a co-expression network for the analysis of aggressive and non-aggressive breast cancer cell lines to predict the clinical outcome of patients, " Molecular Medicine Reports 16: 7967-7978, 2017. (Year: 2017).*

Meng et al., "Biomarker discovery to improve prediction of breast cancer survival: using gene expression profiling, meta-analysis, and tissue validation," Onco Targets and Therapy, , 6177-6185, DOI: 10.2147/OTT.S113855 (Year: 2016).*

Haibe-Kains et al., "Comparison of prognostic gene expression signatures for breast cancer," BMC Genomics 2008, 9:394 doi: 10.1186/1471-2164-9-394 (Year: 2008).*

Van de Vijver et al., "A Gene-Expression Signature as a Predictor of Survival in Breast Cancer," N Engl J Med, vol. 347, No. 25.• Dec. 19, 2002. (Year: 2002).*

Riis et al., "Gene Expression Profile Analysis of T1 and T2 Breast Cancer Reveals Different Activation Pathways," Hindawi Publishing Corporation, ISRN Oncology, vol. 2013, Article ID 924971, 12 pages, http://dx.doi.org/10.1155/2013/924971. (Year: 2013).*

Tang et al., "Overexpression of ASPM, CDC20, and TTK Confer a Poorer Prognosis in Breast Cancer Identified by Gene Co-expression Network Analysis," Front. Oncol. 9:310; doi: 10.3389/fonc.2019.00310. (Year: 2019).*

Yang et al., "Network-Based Inference Framework for Identifying Cancer Genes from Gene Expression Data," Hindawi Publishing Corporation, BioMed Research International, vol. 2013, Article ID 401649, 12 pages, http://dx.doi.org/10.1155/2013/401649. (Year: 2013).*

Iuliano et al., "Combining Pathway Identification and Breast Cancer Survival Prediction via Screening-Network Methods," Front. Genet. 9:206; doi: 10.3389/fgene.2018.00206. (Year: 2018).*

Pepke et al., "Comprehensive discovery of subsample gene expression components by information explanation: therapeutic implications in cancer," Pepke and Ver Steeg BMC Medical Genomics (2017) 10:12; DOI 10.1186/s12920-017-0245-6. (Year: 2017).*

Zhang et al., "Identification of novel prognostic indicators for triple-negative breast cancer patients through integrative analysis of cancer genomics data and protein interactome data," Oncotarget, vol. 7, No. 44 (Year: 2016).*

International Search Report and Written Opinion for International Patent Application No. PCT/IB2020/061014, mailed Feb. 25, 2021, 18 pages.

H Bonsang-Kitzis et al: "Biological network-driven gene selection identifies a stromal imune module as a key determinant of triple-negative breast carcinoma prognosis", Oncoimmunology, vol. 5, No. 1, Jan. 2, 2016 (Jan. 2, 2016), p. e1061176, XP055719202, US ISSN. 2162-4011, DOI. 10.1080/2162402X.2015.1061176.

Brian D. Lehmann et al: "Refinement of Triple-Negative Breast Cancer Molecular Subtypes: Implications for Neoadjuvant Chemotherapy Selection", PLOS ONE, vol. 11, No. 6, Jun. 16, 2016 (Jun. 16, 2016), p. e0157368, XP055325113, DOI: 10.1371/journal.pone. 0157368.

Ozturk Kivilcim et al: "The Emerging Potential for Network Analysis to Inform Precision Cancer Medicine", Journal of Molecular Biology, Academic Press, United Kingdom, vol. 430, No. 18, Jun. 15, 2018 (Jun. 15, 2018), pp. 2875-2899, XP085446856, ISSN:0022-2836, DOI: 10.1016/J.JMB.2018.06.016.

Van't Veer LJ, Dai H, van de Vijver MJ, He YD, Hart AA, et al. (2002) "Gene expression profiling predicts clinical outcome of breast cancer". Nature 415: 530-536.

Paik S, Shak S, Tang G, Kim C, Baker J, et al. (2004) "A multigene assay to predict recurrence of tamoxifen-treated, hode-negative breast cancer". N Engl J Med 351: 2817-2826.

Lehmann B.D., Bauer J.A., Chen X., Sanders M.E., Chakravarthy A.B., Shyr Y. and Pietenpol J.A. 2011: "Identification of Human Triple-Negative Breast Cancer Subtypes and Preclinical Models for Selection of Targeted Therapies." The Journal of Clinical Investigation 121 (7): 2750-67.

Alter O., Brown P.O., and Botstein D. 2000: "Singular Value Decomposition for Genome-Wide Expression Data Processing and Modeling." Proceedings of the National Academy of Sciences of the United States of America 97 (18): 10101-6.

Berry M., Dumais S., O'Brien G. 1995: "Using Linear Algebra for Intelligent Information Retrieval." SIAM Review 37 (4): 573-95.

Font-Clos F., Zapperi S., La Porta C.A.M. 2018: "Topography of Epithelial-Mesenchymal Plasticity." Proceedings of the National Academy of Sciences of the United States of America 115 (23): 5902-7.

\* cited by examiner

METHOD FOR DETERMINING A LONG-TERM SURVIVAL PROGNOSIS OF BREAST CANCER PATIENTS, BASED ON ALGORITHMS MODELLING BIOLOGICAL NETWORKS

CROSS-REFERENCE TO RELATED APPLICATIONS

This application is a National Phase filing of PCT International Application No. PCT/IB2020/061014, having an International Filing Date of Nov. 23, 2020, claiming priority to Italian Patent Application No. 102019000023946, having a filing date of Dec. 13, 2019, each of which is hereby incorporated by reference in its entirety.

TECHNOLOGICAL BACKGROUND OF THE INVENTION

Field of Application

The present invention generally relates to a method for determining a long-term survival prognosis of breast cancer patients, based on algorithms modelling biological networks.

The technical field of the present invention is therefore that of predictive methods, performed by electronic computation, used in the medical field to support predictive prognosis.

Description of the Prior Art

Within the technical field considered, methods are known for predicting the aggressiveness of a breast tumor based on limited sets of genes the expression of which is measured and then compared with reference values. The methods are effective only for very specific tumor sub-types and do not take into account the interaction between genes. For example, two such known methods are described in the following scientific articles:

van't Veer L J, Dai H, van de Vijver M J, He Y D, Hart A A, et al. (2002) "*Gene expression profiling predicts clinical outcome of breast cancer*". Nature 415:530-536 (method underlying the "Mammaprint" test);

Paik S, Shak S, Tang G, Kim C, Baker J, et al. (2004) "*A multigene assay to predict recurrence of tamoxifen-treated, node-negative breast cancer*". N Engl J Med 351:2817-2826 (method underlying the Oncotype DX test).

These known methods have some limits which it would be best to overcome, including the limited scope of application (they are effective only for a few and very specific tumor sub-types) and some accuracy limits due to the reduced number of genes considered and the inability to take into account effects of interactions between genes, which can be very relevant for a correct prediction.

In light of the above, there is therefore a strong need to have methods for predicting the aggressiveness of breast tumors, and more specifically, methods for determining a survival prognosis for a patient suffering from a breast tumor, and in particular a specific molecular sub-type of breast tumor, which are applicable to a wider range of tumor sub-types, and provide more precise and reliable predictive results than the aforesaid known methodologies.

SUMMARY OF THE INVENTION

It is an object of the present invention to provide a method for determining a survival prognosis of a patient suffering from a breast tumor, which allows to at least partially obviate the drawbacks mentioned above with reference to the known art, and to respond to the aforementioned needs particularly felt in the technical field considered. This object is achieved by means of a method according to claim 1.

Further embodiments of the method are defined by claims 2-17.

In summary, an object of the present invention is to provide a method for estimating a long-term survival probability of patients suffering from breast cancer using gene expression data from tumor samples and a biological network, through several steps, which comprise, inter alia: a choice of a relevant biological network and the generation of a continuous data set at the node level, representative of gene expressions; a binarization of the aforesaid data of the continuous data set, to obtain a binarized data set; the calculation of an aggressiveness parameter, or aggressiveness score, based on the binarized data set and possibly of simulated samples; the definition of high risk and low risk groups, the classification of a patient in one of the aforesaid groups, and the generation of personalized reports, which may contain for example the value of the aggressiveness parameter and the risk group associated with each sample.

BRIEF DESCRIPTION OF THE DRAWINGS

Further features and advantages of the method according to the invention will be apparent from the following description which illustrates preferred embodiments, given by way of indicative, non-limiting examples, with reference to the accompanying drawing, in which.

DETAILED DESCRIPTION

Figure 1:
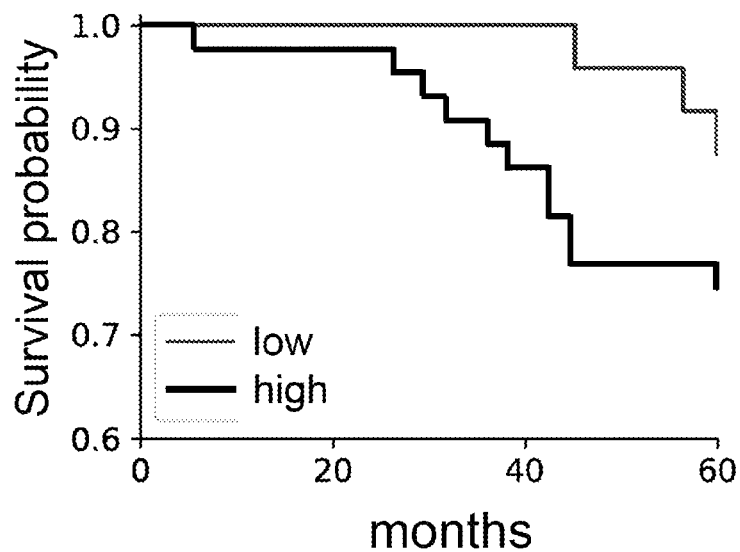
FIGS. 1, 2 and 3 are diagrams showing the evolution over time of the survival probability associated with samples of three respective molecular sub-types of tumor, determined based on an aggressiveness score calculated by the method of the present invention.

A method is described for determining a survival prognosis of a patient suffering from a breast tumor, using processing carried out by electronic processing and/or calculation means.

The method comprises a step (a) of defining a biological network representative of a particular biological process associated with the breast tumor.

The aforesaid biological network comprises a plurality of nodes, a set of directional relationships between these nodes and a set of genes associated with these nodes.

Each node of the biological network represents a gene (for example: CD44) and/or a protein (for example: nuclear beta-catenin) and/or a complex of several proteins (for example: the complex formed by APC, AXIN2 and GSK3B) and/or another molecule (for example mir200) and/or an ion (for example $Ca^{2+}$ or other ions) present in a cell or in contact therewith and/or a particular external condition to which the cell is subjected (for example: hypoxia) and/or states (for example: apoptosis) in which the cell can be found.

An example of the biological networks and of the relative aforesaid entities represented by the nodes is shown by tables 1A, 2A, 3A which are reported in the following in this description.

By way of example, among the many shown in the tables, the gene CD44, the protein nuclear beta-catenin, the protein complex formed by APC, AXIN2 and GSK3B, the molecule mir200 and the hypoxic condition can be found in table 1A; the state of apoptosis can be found in table 3A.

Each directional relationship is defined by a source node, a target node, and an interaction type.

The interaction type comprises an inhibition interaction, in an inhibition relationship (also referred to as an "inhibitory relationship" hereinafter), or an activation interaction, in an activation relationship (also referred to as an "excitatory relationship" hereinafter), or absence of interaction. Each of the interactions has a direction, determined by the source node to the target node.

Therefore, in this description the definition of "biological network" means a digital data set which defines an organized logical structure, defined by the logical entities already mentioned above, i.e., the plurality of nodes, the set of directional relationships between these nodes and the set of genes associated with these nodes.

A biological network represents a particular biological process. This biological process is, for example, a biological process which clinical or experimental evidence recognizes as associated with the tumor, or, in particular, with a molecular sub-type of tumor.

As will be better illustrated below, a biological network can be obtained, in various implementation examples, based on clinical evidence, or from computer simulations or other electronic data calculation or processing methods.

From the point of view of the data structure, the biological network can be represented for example by a matrix M with as many columns and rows as there are nodes of the biological network, in which the content of each box, corresponding to the i-th row and the j-th column encodes the relationship from the i-th node to the j-th node (as will be further exemplified in the following).

Alternatively, the biological network can be described by a pair of tables:
- a first table with two columns, in which each cell of the first column contains the indication of a node, and each cell of the second column contains the indication of the one or more genes associated with the respective node indicated in the same row;
- a second table with three columns, in which each cell of the first column contains the indication of a source node, each cell of the second column contains the indication of a target node, and each cell of the third column comprises the indication of the relationship type which runs from source node to target node.

Examples of such tables will be reported below, for three different cases related to three different types of tumor sub-type.

The method further comprises a step (b) of accessing a data set related to the patient. This data set comprises gene expressions in a biological sample of the aforesaid tumor isolated from the patient.

Then the method includes a step (c) of calculating a continuous expression value for the aforesaid nodes of the biological network, in which this step comprises, in the various possible cases, the following calculations.

If the node is associated with only one gene and if it is found, based on the aforesaid patient data set, that the gene is present in the biological sample, the continuous expression value of the node is calculated as the expression of the associated gene detected in the biological sample.

If the node is associated with multiple genes, and if it is found, based on the aforesaid data set related to the patient, that at least one of the aforesaid genes is present in the biological sample, the continuous expression value of the node is calculated based on the expressions of the associated genes, present in the biological sample.

If the node is not associated with any gene, or if, based on the aforesaid data set related to the patient, the associated gene is not found in the biological sample, the node is marked as a node not associated with a continuous expression value.

For the purposes of the present invention, in the case where only some of the genes associated with a node are expressed, the calculation of the continuous expression is carried out using only the expression of the expressed genes.

The method then includes a step (d) of carrying out, by electronic processing and/or calculation means, a binarization of the data set of continuous expression values calculated for each node of the biological network with which a continuous expression value is associated, based on a comparison of the continuous expression value with a respective threshold. A first binarized data set of the nodes is thus obtained, based on the detections made.

The method then comprises a step (e) of calculating, by the electronic processing and/or calculation means, an aggressiveness score, derivable from the first binarized data set of the nodes, based on the aforesaid first binarized data set of the nodes; and finally a step (f) of determining a survival prognosis result based on the aforesaid calculated aggressiveness score.

According to an embodiment of the method, the aforesaid step (b) of accessing a personalized data set related to the patient (which will hereinafter also be referred to as "personalized data set") comprises accessing data made available by a medical laboratory from the analysis of a tumor sample isolated from the patient, or made available by a medical or clinical institution treating the patient.

According to an implementation option, the expressions of a gene detected in the biological sample are obtained based on a plurality of tumor cells of the biological sample, and the detection of the gene expression is carried out by means of methods known per se.

According to an implementation option, the aforesaid personalized data set also comprises the indication of the tumor sub-type, identified based on the patient's biological sample, by means of methods known per se.

In fact, according to one embodiment, the method is applicable to different forms of known molecular sub-types of breast tumor, and is capable of determining a survival prognosis of a patient suffering from a specific molecular sub-type of breast tumor.

In this case, the aforementioned definition step (a) comprises defining, based on known medical/biological knowledge related to the considered molecular sub-type of breast tumor, a biological network representative of a particular biological process associated with the molecular sub-type of tumor.

Therefore, the teachings of the present patent application can be applied by a person skilled in the art to any molecular sub-type of tumor of which the associated biological processes, and therefore a corresponding biological network, are known from the common medical/biological knowledge.

According to an embodiment of the method, step (f) of determining a survival prognosis result comprises calculating the estimated survival probability based on the calculated aggressiveness score.

For the purposes of the present invention, with the term "survival prognosis", to be read also as "long-term survival prognosis", the estimated probability of survival is meant, i.e., the probability that the patient will be alive a certain number years after having been subjected to the method of the present invention and, therefore, at a certain age.

In particular, this period is about 1 month-10 years, more particularly, 3 months-7 years and even more particularly 6 months-5 years.

According to an embodiment of the method, step (c) of calculating the continuous expression value of the node, if the node is associated with multiple genes, comprises calculating the continuous expression value of the node as the maximum value among the expression values of the associated genes.

According to another embodiment of the method, step (c) of calculating the continuous expression value of the node, if the node is associated with multiple genes, comprises calculating the continuous expression value of the node as the minimum value among the expression values of the associated genes.

According to another embodiment of the method, step (c) of calculating the continuous expression value of the node, if the node is associated with multiple genes, comprises calculating the continuous expression value of the node as the average of the expression values of the associated genes.

According to an implementation option, in the case where a node is not associated with any gene, or if none of the associated genes are found in the personalized data set of gene expression, the node does not have an associated expression.

In the case where some of the genes associated with a node are found in the personalized data set of gene expression, the calculation of the continuous expression of the node is carried out using only the genes present in the personalized data set of gene expression.

In accordance with an embodiment, the method further comprises a step (g) of predefining, for each node to which a continuous expression value is associated, a respective threshold; and therefore attributing to the node a first binary value, if the continuous expression value of the node is less than this threshold, and a second binary value, if the continuous expression value of the node is greater than this threshold.

In a particular implementation option, the first binary value is $-1$ and the second binary value is $+1$.

In this case, according to an implementation example, the biological network can be represented by a matrix in which, in the box corresponding to the i-th row and the j-th column, the relationship from the i-th node to the j-th node is encoded as follows: $-1$, if the corresponding interaction is inhibitory; $+1$, if the corresponding interaction is excitatory; $0$ in case of no interaction.

With reference to the aforesaid pre-definition of the threshold, an embodiment of the method includes that this step comprises the definition of the threshold, for each node to which a continuous expression value is associated, based on a preliminary processing carried out on an available experimental data set, related to a plurality of tumor samples of the particular molecular sub-type considered, coming from patients whose clinical history and survival are known.

The definition of "available experimental data set", also definable as "available clinical data set", indicates in this description an accessible experimental data set (for example in databases made available to the medical community by hospitals, research or other entities) related to a plurality of patients whose biological data related to respective biological tumor samples (including the expressions of the genes in these biological samples) and the clinical history and survival time are known. In other words, it is data collected from clinical practice.

In the following, three examples of databases will be provided, corresponding to three respective sub-types of breast tumors, which have been used in an embodiment of the method for defining the threshold.

In accordance with an embodiment of the method, the aforementioned step of defining the threshold comprises defining the threshold based on machine learning algorithms (such as, for example "Random Forest" or "Support Vector Machine-SVM"), using available experimental data sets of patients whose clinical history (of each of the patients) is known.

In accordance with another embodiment of the method, the step of defining the threshold comprises defining the threshold based on a free energy binarization methodology.

According to an implementation option, the aforesaid free energy binarization methodology comprises calculating the threshold based on a minimization of the difference between the average energy of all the biological samples, belonging to the aforesaid plurality of samples associated with the available experimental data set, and the sum of the entropy of all the nodes of the biological network multiplied by a correction parameter.

In other words, according to an implementation option of the method, given a biological network, the threshold values for the binarization of all the nodes of the biological network are calculated by minimizing the difference between the average energy of all the aforesaid biological samples and the sum of the entropy of all the nodes (also calculated based on the aforesaid available experimental data set), multiplied by a correction parameter. This parameter plays a role which is similar to that played by temperature in the thermodynamic free energy of a system, i.e., it establishes the relative weights of energy and entropy. In the case in question, the corrective parameter is chosen in the order of a few units.

The aforesaid minimization is carried out on all possible threshold values on all nodes simultaneously through numerical optimization, for example using the simulated annealing method or other equivalent numerical methods.

It should be noted that, also in this case, the algorithm allows to estimate a distinct threshold for each node.

Advantageously, the fact that a specific threshold is calculated for each node to which a continuous expression value is associated, usually different from node to node, allows to considerably improve the efficiency of the binarization operation.

The entropy of a node is defined as minus the fraction of the above-threshold nodes by the logarithm thereof minus the fraction of below-threshold nodes by the logarithm thereof.

According to another embodiment of the method, the step of defining the threshold comprises defining the threshold based on a methodology based on Gaussian kernels or based on the average expression.

The Gaussian kernel method consists in performing a "fitting" of a mixed two-component Gaussian model on the continuous distribution of each node, and then establishing the threshold value using the posterior distribution of the fitting model.

The Gaussian kernel methodology is known per se, and is described for example in the scientific papers:

Lehmann B. D., Bauer J. A., Chen X., Sanders M. E., Chakravarthy A. B., Shyr Y. and Pietenpol J. A. 2011: *"Identification of Human Triple-Negative Breast Cancer Subtypes and Preclinical Models for Selection of Targeted Therapies."* The Journal of Clinical Investigation 121 (7): 2750-67;

Bishop, Christopher M. 2006: "Pattern Recognition and Machine Learning". Heidelberh: Springer-Verlag.

According to another embodiment of the method, the step of defining the threshold comprises defining the threshold on the basis of a methodology based on the average expression. This methodology sets the threshold as equal to the average expression of each node.

According to various possible embodiments of the method (which will be better detailed in the following), step (e) of calculating an aggressiveness score comprises calculating the aggressiveness score as the patient's biological sample energy and/or the fraction of the out-of-balance nodes of the patient's biological sample and/or based on a projection of the data set on the principal component thereof through a Principal Component Analysis methodology and/or based on a projection of the data set on the first principal component of the simulated binarized data set, through a Principal Component Analysis methodology.

Therefore, the present invention provides a plurality of possible options (which have proved effective in the prognostic context considered), regarding the method for calculating the aggressiveness score.

According to an implementation option of the method, step (e) of calculating an aggressiveness score comprises calculating the aggressiveness score according to a plurality of the aforesaid methods, or according to all of the aforesaid methods.

In this case, the method also includes carrying out a plurality of instances of the steps of the method, using a respective aggressiveness score among the aggressiveness scores calculated according to a respective methodology of the aforesaid different calculation methodologies, on each of the cases of an experimental database of cases of patients affected by a specific molecular sub-type of breast tumor, the prognosis of which is known; and then selecting, for the molecular sub-type of tumor considered, the calculation methodology which provides the most accurate prediction.

According to an implementation option, the method comprises the further step of validating the selected calculation methodology on a further experimental data set of cases the prognosis of which is known, independent of the aforesaid experimental database, in order to improve the predictive efficacy and avoid "overfitting".

Further details are provided below on each of the methodologies for defining and calculating the aggressiveness parameter mentioned above.

In accordance with an embodiment of the method, step (e) of calculating an aggressiveness score comprises defining the aggressiveness score as the energy of the patient's biological sample, defined as the number of satisfied relationships in the respective biological network minus the number of unsatisfied relationships in the respective biological network.

A satisfied relationship is defined as an activation relationship in which the source node and the target node take the same value, or as an inhibition relationship in which the source node and the target node take different values.

An unsatisfied relationship is defined as an activation relationship in which the source node and the target node take different values, or an inhibition relationship in which the source node and the target node take the same value.

According to another embodiment of the method, step (e) of calculating an aggressiveness score comprises defining the aggressiveness score as the fraction of the out-of-balance nodes of the patient's biological sample, wherein the fraction of out-of-balance nodes is defined as the number of out-of-balance nodes divided by the total number of nodes in the biological network.

A node is considered to be out-of-balance if the application of the "majority rule" would change the state thereof. This rule assumes that the state of a node is determined by comparing the excitatory and inhibitory relationships so that the node is active when the excitatory relationships exceed the inhibitory ones and is otherwise inactive. The out-of-balance nodes are those which do not comply with the rule described above.

In accordance with another embodiment of the method, step (e) of calculating an aggressiveness score comprises defining the aggressiveness score based on a projection of the data set on the principal component thereof through a Principal Component Analysis methodology.

The "Principal Component Analysis" methodology is a standard technique for reducing the dimensionality of vector spaces, which consists in finding a set of vectors or main (or principal) components on which the data express the maximum variability thereof. By projecting the data only on the first principal component, and neglecting the rest, only one value is effectively obtained for each sample, while maintaining most of the variability of the original data.

The "Principal Component Analysis" methodology is known per se, and is illustrated, for example, in the following scientific articles:

Alter O., Brown P. O., and Botstein D. 2000: "Singular Value Decomposition for Genome-Wide Expression Data Processing and Modeling." Proceedings of the National Academy of Sciences of the United States of America 97 (18): 10101-6;

Berry M., Dumais S., O'Brien G. 1995: "Using Linear Algebra for Intelligent Information Retrieval." SIAM Review 37 (4): 573-95;

Everitt B. S., Dunn G. 2013. Principal Components Analysis. In Applied Multivariate Data Analysis. Wiley—doi: 10.1002/9781118887486.ch3.

This known technique is applied innovatively in the present context, as illustrated above.

According to a still further embodiment of the method, step (e) of calculating an aggressiveness score comprises simulating, by computational simulation, the biological network, through simulated samples representing the possible cellular states described (i.e., encoded) by the biological network, to obtain a simulated binarized data set; and then defining the aggressiveness score based on a projection of the data set on the first principal component of the simulated binarized data set, through the aforementioned Principal Component Analysis methodology.

A simulated data set of a given biological network is defined as a set of binary samples obtained through computer simulation.

According to an implementation option, the aforementioned step of simulating the biological network comprises: numerically calculating the state of the biological network starting from a certain initial condition chosen randomly; then, by means of the simulation algorithm, updating the binarized value of each node, in a sequential manner, changing the state thereof so that there is an increase in the number of satisfied directional relationships among the directional relationships of which the aforementioned node is target; then, iterating the aforesaid updating step until a steady state of the biological network is reached, in which each node is in a binary state which satisfies the majority of the directional relationships of which it is the target. The aforesaid steady state corresponds to a possible state of the cell.

According to a particular implementation option, the aforesaid steps of calculating, updating and iterating are repeated several times, with different initial conditions, to represent a plurality of potential states in which the cell can be found.

According to a more detailed example, for a given biological network formed by N nodes the relationships of which are encoded in a matrix M, the simulation of a binary sample proceeds according to the following steps:
 (i) creating a vector v the components of which assume values +1 or −1 determined randomly, but with the same probability of occurrence;
 (ii) updating the vector values v using the "majority rule", as illustrated for example in the article Font-Clos F., Zapperi S., La Porta C. A. M. 2018: *"Topography of Epithelial-Mesenchymal Plasticity."* Proceedings of the National Academy of Sciences of the United States of America 115 (23): 5902-7;
 (iii) repeating step (ii) until no vector component v changes the state thereof.

The above steps can be repeated several times, with different initial conditions, to obtain a data set of simulated samples.

Figure 4:
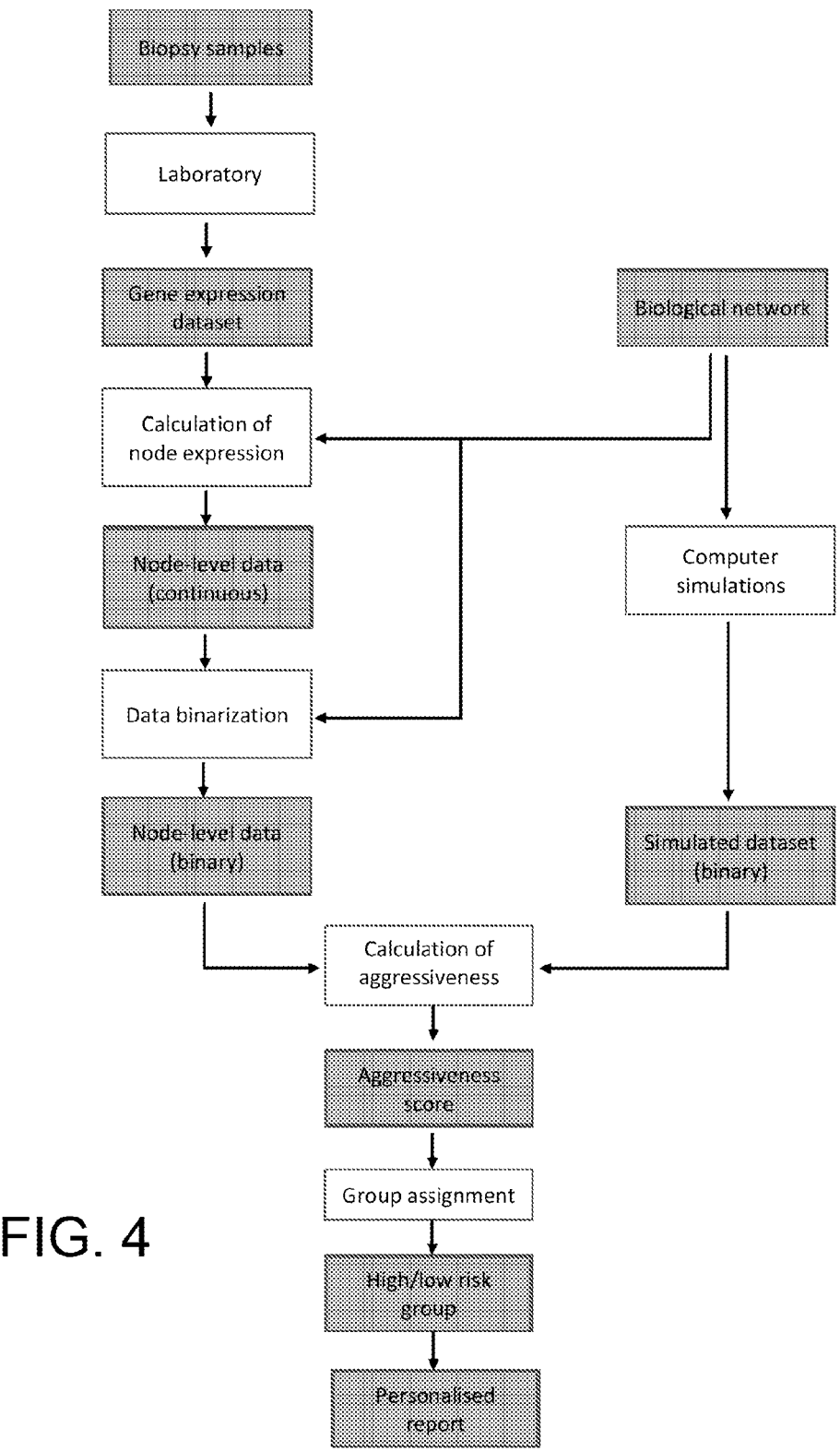
FIG. 4 shows a flow diagram of an embodiment of the method of the invention.

A block diagram depicting the aforesaid embodiment of the method, also comprising biological network simulation, is shown in FIG. 4.

As illustrated above, the aggressiveness score can be calculated in several ways, and the choice may depend on the molecular sub-type of tumor being analyzed.

Some of the possible calculation methodologies use simulated samples, as described above, which represent possible cellular states described by the biological network and are obtained by computer simulations of so-called Boolean models.

This is another innovative aspect of the procedure: the joint analysis of biological samples and simulated samples. Through the use of simulated samples, the scores assigned to the biological samples can be more effectively positioned within the real range of possible values.

More generally, the results of the simulations (which are carried out on "abstract" simulated samples) allow to reconstruct a virtual panorama of possible states, allowing a better classification of the experimental data. This is indicated, in the block diagram of FIG. 4 which precisely represents this example, by the flow of operations shown to the right of the main flow. In this case, the "aggressiveness calculation" block receives two inputs, the binarized data at the node level and the binarized data of the simulated data set: the calculation is mainly carried out based on the binarized data at the node level, deriving from the real data of the patient, but also taking into account information derived from the simulated data set.

According to an embodiment of the method, the step of calculating the estimated survival probability comprises calculating the estimated survival probability based on a relationship between the estimated survival probability and the aggressiveness score, in which this relationship is predetermined based on experimental data.

For this purpose, according to an implementation, the aggressiveness score is calculated on the samples of the experimental data set, with the same calculation methodology used on the personalized data set, and for each sample, the aggressiveness score value obtained is compared and/or correlated with the survival probability, which, for each sample of the available experimental data set, is known. From this, a curve and/or a relationship between the estimated survival probability and the aggressiveness score can be derived.

According to another embodiment of the method, the step of calculating the estimated survival probability comprises calculating the estimated survival probability based on a relationship between the estimated survival probability and the aggressiveness score, in which this relationship is obtained by processing with one or more trained predictive algorithms.

According to an implementation option, the one or more trained algorithms comprise machine learning algorithms, or other trained predictive algorithms. In this case, the training step is carried out on an available experimental data set, which is partitioned into a test set and a training set, according to training methodologies known per se.

Also in this case, according to an implementation option, the aggressiveness score is calculated on the samples of the experimental training data set, with the same calculation methodology used on the personalized data set, and for each sample, the aggressiveness score value obtained and the survival probability value, known, are provided as training input to the algorithm, so that the algorithm adapts, based on what has been learned, and encodes a relationship between the aggressiveness score and the estimated survival probability.

Then, to refine the training, the trained algorithm is tested on the samples of the test experimental data set, providing the aggressiveness parameter value of each sample in input, and taking the result provided by the algorithm, in terms of survival probability, to compare it with the known survival probability associated with the sample.

Once the algorithm training has been completed, it is used on personalized samples, receiving the calculated aggressiveness score as input and providing a survival probability value as output.

From what has been illustrated above, it is evident that the method of determining the link between the aggressiveness score and the survival probability (and therefore the predictive result of the prognosis) does not depend on the experimental data set used; the method can be applied by a person skilled in the art, based on the teachings provided in this description, using an experimental data set available.

According to an embodiment of the method, the step of calculating an estimated survival probability comprises calculating the estimated survival probability as a function of time.

As described above, the time interval considered is about 1 month-10 years, more in particular, it is 3 months-7 years and even more in particular it is 6 months-5 years.

According to an implementation option, the aforesaid step of calculating an estimated probability firstly comprises classifying the patient into a high risk group or a low risk group, in which the high and low risk groups are defined with respect to a lower quantile value threshold or a higher quantile value threshold of the survival probability distribution compared to the aggressiveness score values; then, the patient is assigned a probability prospect associated with the group to which the patient belongs in which the patient was classified.

This probability prospect associated with the group to which each of the "high risk" and "low risk" groups belongs is calculated upstream in a training step, based on experimental data.

For example, the low risk group is defined as the set of samples which have an aggressiveness score below a certain lower quantile value (for example 10%). The high risk group is defined as the set of samples which have an aggressiveness score above a certain higher quantile value (for example 90%).

According to several possible implementation examples, the upper and lower quantile values are established in one of the following manners:
  (i) using known predetermined values to give satisfactory results; or
  (ii) separating the experimental data set into a training set and a test set and imposing a certain survival probability for the high and low risk groups on the training set only; or
  (iii) using other methods, such as machine learning algorithms.

According to an embodiment, the method further comprises the step of providing the patient with a personalized report, containing the calculated aggressiveness score value and/or the determined risk group to which she belongs.

According to particular aspects of the present invention, the biological network refers to the following molecular sub-types of breast tumor: ERBB2, PIM, EMT-MET.

Tables 1A, 2A, and 3A report the genes associated with each node in each of the biological networks, respectively, for the molecular sub-types ERBB2, PIM and EMT-MET.

Tables 1B, 2B and 3B instead report the associations between each node and the genes and/or entities.

For the purposes of the present invention, the experimental data set, in particular each for each molecular sub-type, is used to identify the relationship which, starting from the aggressiveness score, leads to the survival probability.

According to another aspect of the present invention, the experimental data set, in particular each for each molecular sub-type, is also used for defining the threshold.

In particular, the term "threshold" also means a minimum value above which the gene is considered to be expressed in a given sample.

The biological networks shown in the following examples are biological networks obtained, with some modifications or adaptations, based on known biological networks.

However, it should be noted that the method described here, for its own nature, can be applied, in principle, to any biological network recognized as relevant with respect to a tumor sub-type considered, based on clinical knowledge already known per se (further examples of such biological networks are documented in the literature), or which may emerge from any evolutions of clinical knowledge in the field of biological networks.

The choice and methods of calculating the aggressiveness score, presented for each of the following cases, are provided merely by way of example. In fact, as previously observed, all the previously described calculation methods can be applied, and, according to one of the aforementioned embodiments, a pre-evaluation can be provided to choose the aggressiveness parameter which is most effective for a given molecular sub-type of breast tumor.

Biological Network Example 1: EMT-MET

The biological network associated with the molecular sub-type EMT-MET represents the biological process of transition between epithelial and mesenchymal states, comprising both the epithelial-mesenchymal transition (EMT) and the mesenchymal-epithelial transition (MET). In this example, the biological network is made up of 72 nodes. These 72 nodes, and the corresponding associated genes, are shown in table 1A below.

TABLE 1A

| Node | Genes |
| --- | --- |
| AKT | AKT1, AKT2 |
| AXIN2 | AXIN2 |
| CD44 | CD44 |
| CDC42 | CDC42 |
| CHD1L | CHD1L |
| Csl | RBPJ |
| Csn | COPS8, COPS2, COPS3, COPS6, COPS4, COPS5, COPS7B, COPS7A |
| DELTA | DLL1 |
| DSH | DVL1 |
| Destcompl | APC, AXIN2, GSK3B |
| EGF | EGF |
| EGFR | EGFR |
| EGR1 | EGR1 |
| ERK | MAPK3, MAPK1 |
| Ecadherin | CDH1 |
| FGF | FGF2 |
| FGFR | FGFR1 |
| FOXC2 | FOXC2 |
| FUS. | STK36 |
| Frizzled | FZD1 |
| GLI | GLI2, GLI1 |
| GSK3 | GSK3B |
| Goosecoid | GSC |
| HEY1 | HEY1 |
| HGF | HGF |
| HIF1 | HIF1A |
| Hypoxia | |
| IGF1 | IGF1 |
| IGF1R | IGF1R |
| IKK | CHUK |
| ILK | ILK |
| JAK | JAK2, JAK3 |
| Jagged | JAG1 |
| KLF4 | KLF4 |
| LIF | LIF |
| LIFR | LIFR |
| LIV1 | SLC39A6 |
| LOXL23 | LOXL2, LOXL3 |
| MEK | MAP2K2, MAP2K1 |
| NOTCH | NOTCH1 |
| NFB | NFKB1 |
| NOTCHic | NOTCH1 |
| PDGF | PDGFB |
| PAK1 | PAK1 |
| PDGFR | PDGFRB, PDGFRA |
| PI3K | PIK3CA, PIK3CB, PIK3CG |
| Patched | PTCH1 |
| RAF | RAF1 |
| RAS | HRAS |
| RKIP | PEBP4 |
| SHH | SHH |
| SMAD | SMAD4, SMAD2, SMAD3 |
| SMO | SMO |
| SNAI1 | SNAI1 |
| SNAI2 | SNAI2 |
| SOSGRB2 | GRB2, SOS1 |
| SRC | SRC |
| STAT | STAT3, STAT1 |
| SUFU | SUFU |
| TGF | TGFB1 |
| TCFLEF | TCF4, LEF1 |
| TGFR | TGFBR2, TGFBR1 |
| TWIST1 | TWIST1 |
| TrCP | BTRC |
| Wnt | WNT1 |
| ZEB1 | ZEB1 |
| ZEB2 | ZEB2 |
| cMet | MET |
| cateninmemb | CTNNB1 |
| cateninnuc | CTNNB1 |
| cfos | FOS |
| miR200 | MIR200B |

The 142 relationships between nodes (relationships from a source node to a target node) are shown in table 1B below.

TABLE 1B

| Source Node | Target Node | Relationship type |
| --- | --- | --- |
| ILK | AKT | excitatory |
| PI3K | AKT | excitatory |
| AXIN2 | AXIN2 | excitatory |
| TCFLEF | AXIN2 | excitatory |
| TCFLEF | CD44 | excitatory |
| TGFR | CDC42 | excitatory |
| CHD1L | CDC42 | excitatory |
| NOTCHic | Csl | excitatory |
| NFB | Csn | excitatory |
| RAS | DELTA | excitatory |
| Frizzled | DSH | excitatory |
| cateninnuc | Destcompl | excitatory |
| GSK3 | Destcompl | excitatory |
| AXIN2 | Destcompl | excitatory |
| Destcompl | Destcompl | excitatory |
| KLF4 | Ecadherin | excitatory |
| cateninmemb | Ecadherin | excitatory |
| TWIST1 | Ecadherin | inhibitory |
| SNAI2 | Ecadherin | inhibitory |
| SNAI1 | Ecadherin | inhibitory |
| ZEB1 | Ecadherin | inhibitory |
| FOXC2 | Ecadherin | inhibitory |
| HEY1 | Ecadherin | inhibitory |
| EGF | EGFR | excitatory |
| cfos | EGR1 | excitatory |
| MEK | ERK | excitatory |
| FGF | FGFR | excitatory |
| TWIST1 | FOXC2 | excitatory |
| SNAI1 | FOXC2 | excitatory |
| Goosecoid | FOXC2 | excitatory |
| SMO | FUS. | excitatory |
| Wnt | Frizzled | excitatory |
| TCFLEF | GLI | excitatory |
| SUFU | GLI | inhibitory |
| Csn | GSK3 | inhibitory |
| ERK | GSK3 | inhibitory |
| Destcompl | GSK3 | inhibitory |
| DSH | GSK3 | inhibitory |
| AKT | GSK3 | inhibitory |
| Csl | HEY1 | excitatory |
| SMAD | HEY1 | excitatory |
| Hypoxia | HIF1 | excitatory |
| IGF1 | IGF1R | excitatory |
| AKT | IKK | excitatory |
| SMAD | ILK | excitatory |
| LIFR | JAK | excitatory |
| TCFLEF | Jagged | excitatory |
| SMAD | Jagged | excitatory |
| STAT | KLF4 | excitatory |
| ZEB2 | KLF4 | inhibitory |
| LIF | LIFR | excitatory |
| STAT | LIV1 | excitatory |
| HIF1 | LOXL23 | excitatory |
| RAF | MEK | excitatory |
| SOSGRB2 | MEK | excitatory |
| RKIP | MEK | inhibitory |
| IKK | NFB | excitatory |
| Jagged | NOTCH | excitatory |
| DELTA | NOTCH | excitatory |
| NOTCH | NOTCHic | excitatory |
| CDC42 | PAK1 | excitatory |
| PDGF | PDGFR | excitatory |
| RAS | PI3K | excitatory |
| LIFR | PI3K | excitatory |
| SHH | Patched | inhibitory |
| RAS | RAF | excitatory |
| SRC | RAS | excitatory |
| SOSGRB2 | RAS | excitatory |
| TCFLEF | RAS | excitatory |
| GSK3 | RAS | inhibitory |
| SNAI1 | RKIP | inhibitory |
| ERK | RKIP | inhibitory |
| GLI | SHH | excitatory |
| SMAD | SHH | excitatory |
| TGFR | SMAD | excitatory |
| ZEB1 | SMAD | excitatory |
| ERK | SMAD | excitatory |
| ZEB2 | SMAD | inhibitory |
| Patched | SMO | inhibitory |
| LOXL23 | SNAI1 | excitatory |
| GLI | SNAI1 | excitatory |
| Goosecoid | SNAI1 | excitatory |
| LIV1 | SNAI1 | excitatory |
| Csl | SNAI1 | excitatory |
| EGR1 | SNAI1 | excitatory |
| SMAD | SNAI1 | excitatory |
| PAK1 | SNAI1 | excitatory |
| GSK3 | SNAI1 | inhibitory |
| TrCP | SNAI1 | inhibitory |
| cateninnuc | SNAI2 | excitatory |
| SNAI2 | SNAI2 | excitatory |
| TWIST1 | SNAI2 | excitatory |
| ERK | SNAI2 | excitatory |
| TGFR | SOSGRB2 | excitatory |
| FGFR | SOSGRB2 | excitatory |
| cMet | SOSGRB2 | excitatory |
| IGF1R | SOSGRB2 | excitatory |
| PDGFR | SOSGRB2 | excitatory |
| EGFR | SOSGRB2 | excitatory |
| LIFR | SOSGRB2 | excitatory |
| ERK | SOSGRB2 | inhibitory |
| PDGFR | SRC | excitatory |
| cMet | SRC | excitatory |
| EGFR | SRC | excitatory |
| IGF1R | SRC | excitatory |
| FGFR | SRC | excitatory |
| SRC | STAT | excitatory |
| JAK | STAT | excitatory |
| FUS. | SUFU | inhibitory |
| cateninnuc | TCFLEF | excitatory |
| TWIST1 | TGF | excitatory |
| GLI | TGF | excitatory |
| SNAI1 | TGF | excitatory |
| Goosecoid | TGF | excitatory |
| TGF | TGFR | excitatory |
| HIF1 | TWIST1 | excitatory |
| SNAI1 | TWIST1 | excitatory |
| NFB | TWIST1 | excitatory |
| TCFLEF | TWIST1 | excitatory |
| Goosecoid | TWIST1 | excitatory |
| GLI | Wnt | excitatory |
| HIF1 | ZEB1 | excitatory |
| SNAI1 | ZEB1 | excitatory |
| Goosecoid | ZEB1 | excitatory |
| miR200 | ZEB1 | inhibitory |
| HIF1 | ZEB2 | excitatory |
| SNAI1 | ZEB2 | excitatory |
| Goosecoid | ZEB2 | excitatory |
| miR200 | ZEB2 | inhibitory |
| ERK | cfos | excitatory |
| HGF | cMet | excitatory |
| CD44 | cMet | excitatory |
| SNAI1 | miR200 | inhibitory |
| ZEB1 | miR200 | inhibitory |
| ZEB2 | miR200 | inhibitory |
| Ecadherin | cateninmemb | excitatory |
| cateninnuc | cateninmemb | inhibitory |
| Ecadherin | cateninnuc | inhibitory |
| cateninmemb | cateninnuc | inhibitory |
| Destcompl | cateninnuc | inhibitory |
| SUFU | cateninnuc | inhibitory |
| Csn | TrCP | inhibitory |

Biological Network Example 2: ERBB2

The biological network associated with the molecular sub-type ERBB2 represents the biological processes driven by human epidermal growth factor receptors, and is relevant for the survival and proliferation of tumor cells. In this example, the biological network is made up of 102 nodes. These 102 nodes, and the corresponding associated genes, are shown in table 2A below.

TABLE 2A

| Node | Genes |
|---|---|
| actinreorg | |
| akt | AKT1 |
| aktd | |
| ap1 | |
| ar | AREG |
| bad | BAD |
| bir | NRG1, EGF |
| btc | BTC |
| ca | |
| ccbl | CBL |
| cfos | FOS |
| cjun | JUN |
| cmyc | MYC |
| creb | CREB1 |
| csrc | SRC |
| dag | |
| egf | EGF |
| elk1 | ELK1 |
| endocyt_degrad | |
| epr | EREG |
| eps8r | EPS8 |
| erbb1 | EGFR |
| erbb11 | |
| erbb12 | |
| erbb13 | |
| erbb14 | |
| erbb2 | ERBB2 |
| erbb23 | |
| erbb24 | |
| erbb3 | ERBB3 |
| erbb34 | |
| erbb4 | ERBB4 |
| erbb44 | |
| erk12 | MAPK1, MAPK2 |
| gab1 | GAB1 |
| grb2 | GRB2 |
| gsk3 | GSK3A, GSK3B |
| hbegf | HBEGF |
| hsp27 | |
| ip3 | |
| jnk | MAPK8 |
| limk1 | LIMK1 |
| mek12 | MAP2K1, MAP2K2 |
| mekk1 | MAP3K1 |
| mekk4 | MAP3K4 |
| mk2 | MAPKAPK2 |
| mkk3 | MAP2K3 |
| mkk4 | MAP2K4 |
| mkk6 | MAP2K6 |
| mkk7 | MAP2K7 |
| mkp | |
| mlk3 | MAP3K11 |
| mtor_rap | MTOR, RPTOR |
| mtor_ric | MTOR, RICTOR |
| mtorr | |
| nck | NCK1 |
| nrg1a | NRG1 |
| nrg1b | NRG1 |
| nrg2a | NRG2 |
| nrg2b | NRG2 |
| nrg3 | NRG3 |
| nrg4 | NRG4 |
| nucerk12 | MAPK1, MAPK3 |
| p38 | MAPK14 |
| p70s6_1 | RPS6KB1 |
| p70s6_2 | RPS6KB1 |
| p90rsk | RPS6KA1 |
| p90rskerk12d | RPS6KA1, MAPK1, MAPK3 |
| pak1 | PAK1 |
| pdk1 | PDK1 |
| pi34p2 | |
| pi3k | PIK3CA |
| pi3kr | PIK3CA |
| pip3 | |
| pkc | PRKCA, PRKCB, PRKCG, PRKCD, PRKCE, PRKCH, PRKCQ, PRKCI, PRKCZ |
| plcg | PLCG1 |
| pp2a | PPP2CA |
| pp2b | |
| pro_apoptotic | |
| pten | PTEN |
| ptend | PTEN |
| rab5a | RAB5A |
| raccdc42 | CDC42 |
| raf1 | RAF1 |
| ras | HRAS |
| rasgap | RASA1 |
| rheb | RHEB |
| rin1 | RIN1 |
| rntre | USP6NL |
| shc | SHC1 |
| ship2 | INPPL1 |
| ship2d | INPPL1 |
| shp1 | PTPN6 |
| shp1d | PTPN6 |
| shp2 | PTPN11 |
| sos1 | SOS1 |
| sos1eps8e3b1 | SOS1, EPS8, ABI1 |
| sos1r | SOS1 |
| stat1 | STAT1 |
| stat3 | STAT3 |
| stat5 | STAT5 |
| tgfa | TGFA |
| tsc1_tsc2 | TSC1, TSC2 |
| vav2 | VAV2 |

The 226 relationships between nodes (relationships from a source node to a target node) are shown in table 2B below.

TABLE 2B

| Source Node | Target Node | Relationship type |
|---|---|---|
| akt | aktd | excitatory |
| akt | bad | inhibitory |
| akt | gsk3 | inhibitory |
| akt | tsc1_tsc2 | inhibitory |
| aktd | raf1 | inhibitory |
| ar | erbb11 | excitatory |
| ar | erbb13 | excitatory |
| bad | pro_apoptotic | excitatory |
| bir | erbb11 | excitatory |
| bir | erbb12 | excitatory |
| bir | erbb23 | excitatory |
| bir | erbb24 | excitatory |
| bir | erbb44 | excitatory |
| btc | erbb11 | excitatory |
| btc | erbb12 | excitatory |
| btc | erbb13 | excitatory |
| btc | erbb23 | excitatory |
| btc | erbb24 | excitatory |
| btc | erbb44 | excitatory |
| ca | pkc | excitatory |
| ccbl | endocyt_degrad | excitatory |
| cfos | ap1 | excitatory |
| cjun | ap1 | excitatory |
| csrc | raf1 | excitatory |
| csrc | stat1 | excitatory |
| csrc | stat3 | excitatory |
| csrc | stat5 | excitatory |
| dag | pkc | excitatory |
| egf | erbb11 | excitatory |
| egf | erbb12 | excitatory |
| egf | erbb13 | excitatory |
| egf | erbb14 | excitatory |
| egf | erbb24 | excitatory |
| endocyt_degrad | erbb11 | inhibitory |
| epr | erbb11 | excitatory |
| epr | erbb12 | excitatory |
| epr | erbb13 | excitatory |
| epr | erbb14 | excitatory |
| epr | erbb23 | excitatory |
| epr | erbb24 | excitatory |
| eps8r | rntre | excitatory |

TABLE 2B-continued

| Source Node | Target Node | Relationship type |
|---|---|---|
| eps8r | sos1eps8e3b1 | excitatory |
| erbb1 | erbb11 | excitatory |
| erbb1 | erbb12 | excitatory |
| erbb1 | erbb13 | excitatory |
| erbb1 | erbb14 | excitatory |
| erbb11 | ccbl | excitatory |
| erbb11 | gab1 | excitatory |
| erbb11 | grb2 | excitatory |
| erbb11 | nck | excitatory |
| erbb11 | plcg | excitatory |
| erbb11 | rntre | excitatory |
| erbb11 | shc | excitatory |
| erbb11 | shp1 | excitatory |
| erbb11 | stat1 | excitatory |
| erbb11 | stat3 | excitatory |
| erbb11 | stat5 | excitatory |
| erbb11 | vav2 | excitatory |
| erbb12 | grb2 | excitatory |
| erbb12 | shc | excitatory |
| erbb13 | grb2 | excitatory |
| erbb13 | pi3k | excitatory |
| erbb13 | shc | excitatory |
| erbb14 | grb2 | excitatory |
| erbb14 | nck | excitatory |
| erbb14 | shc | excitatory |
| erbb2 | erbb12 | excitatory |
| erbb2 | erbb13 | inhibitory |
| erbb2 | erbb14 | inhibitory |
| erbb2 | erbb23 | excitatory |
| erbb2 | erbb24 | excitatory |
| erbb2 | erbb34 | inhibitory |
| erbb23 | grb2 | excitatory |
| erbb23 | pi3k | excitatory |
| erbb23 | shc | excitatory |
| erbb24 | grb2 | excitatory |
| erbb24 | shc | excitatory |
| erbb24 | stat5 | excitatory |
| erbb3 | erbb13 | excitatory |
| erbb3 | erbb23 | excitatory |
| erbb3 | erbb34 | excitatory |
| erbb34 | grb2 | excitatory |
| erbb34 | pi3k | excitatory |
| erbb34 | shc | excitatory |
| erbb4 | erbb14 | excitatory |
| erbb4 | erbb24 | excitatory |
| erbb4 | erbb34 | excitatory |
| erbb4 | erbb44 | excitatory |
| erbb44 | grb2 | excitatory |
| erbb44 | nck | excitatory |
| erbb44 | shc | excitatory |
| erk12 | cfos | excitatory |
| erk12 | nucerk12 | excitatory |
| erk12 | p70s6_1 | excitatory |
| erk12 | p90rsk | excitatory |
| erk12 | p90rskerk12d | excitatory |
| gab1 | pi3k | excitatory |
| gab1 | rasgap | excitatory |
| gab1 | shp2 | excitatory |
| grb2 | gab1 | excitatory |
| grb2 | pak1 | excitatory |
| grb2 | sos1 | excitatory |
| gsk3 | cmyc | inhibitory |
| hbegf | erbb11 | excitatory |
| hbegf | erbb12 | excitatory |
| hbegf | erbb24 | excitatory |
| ip3 | ca | excitatory |
| jnk | cfos | excitatory |
| jnk | cjun | excitatory |
| jnk | p70s6_1 | excitatory |
| limk1 | actinreorg | excitatory |
| mek12 | erk12 | excitatory |
| mekk1 | mek12 | excitatory |
| mekk1 | mkk4 | excitatory |
| mekk1 | mkk7 | excitatory |
| mekk4 | mkk4 | excitatory |
| mk2 | creb | excitatory |
| mk2 | hsp27 | excitatory |
| mkk3 | p38 | excitatory |
| mkk4 | jnk | excitatory |
| mkk4 | p38 | excitatory |
| mkk6 | p38 | excitatory |
| mkk7 | jnk | excitatory |
| mkp | nucerk12 | inhibitory |
| mlk3 | mkk3 | excitatory |
| mlk3 | mkk4 | excitatory |
| mlk3 | mkk6 | excitatory |
| mtor_rap | p70s6_2 | excitatory |
| mtor_ric | akt | excitatory |
| mtorr | mtor_rap | excitatory |
| mtorr | mtor_ric | excitatory |
| nck | pak1 | excitatory |
| nrg1a | erbb13 | excitatory |
| nrg1a | erbb14 | excitatory |
| nrg1a | erbb23 | excitatory |
| nrg1a | erbb24 | excitatory |
| nrg1a | erbb34 | excitatory |
| nrg1a | erbb44 | excitatory |
| nrg1b | erbb13 | excitatory |
| nrg1b | erbb14 | excitatory |
| nrg1b | erbb23 | excitatory |
| nrg1b | erbb24 | excitatory |
| nrg1b | erbb34 | excitatory |
| nrg1b | erbb44 | excitatory |
| nrg2a | erbb13 | excitatory |
| nrg2a | erbb14 | excitatory |
| nrg2a | erbb24 | excitatory |
| nrg2a | erbb34 | excitatory |
| nrg2b | erbb14 | excitatory |
| nrg2b | erbb23 | excitatory |
| nrg2b | erbb24 | excitatory |
| nrg2b | erbb34 | excitatory |
| nrg2b | erbb44 | excitatory |
| nrg3 | erbb24 | excitatory |
| nrg3 | erbb44 | excitatory |
| nrg4 | erbb14 | excitatory |
| nrg4 | erbb24 | excitatory |
| nrg4 | erbb44 | excitatory |
| nucerk12 | cmyc | excitatory |
| nucerk12 | elk1 | excitatory |
| p38 | mk2 | excitatory |
| p70s6_1 | p70s6_2 | excitatory |
| p90rsk | cfos | excitatory |
| p90rsk | creb | excitatory |
| p90rsk | gsk3 | inhibitory |
| p90rsk | p90rskerk12d | excitatory |
| p90rskerk12d | sos1 | inhibitory |
| pak1 | bad | inhibitory |
| pak1 | limk1 | excitatory |
| pak1 | raf1 | excitatory |
| pdk1 | akt | excitatory |
| pdk1 | p70s6_2 | excitatory |
| pdk1 | p90rsk | excitatory |
| pdk1 | pkc | excitatory |
| pi34p2 | akt | excitatory |
| pi34p2 | vav2 | excitatory |
| pi3k | pi34p2 | excitatory |
| pi3k | pip3 | excitatory |
| pi3kr | pi3k | excitatory |
| pi3kr | sos1eps8e3b1 | excitatory |
| pip3 | akt | excitatory |
| pip3 | gab1 | excitatory |
| pip3 | sos1eps8e3b1 | excitatory |
| pip3 | vav2 | excitatory |
| plcg | dag | excitatory |
| plcg | ip3 | excitatory |
| pp2a | akt | inhibitory |
| pp2a | cfos | inhibitory |
| pp2b | elk1 | inhibitory |
| pten | ptend | excitatory |
| ptend | pi34p2 | inhibitory |
| ptend | pip3 | inhibitory |
| rab5a | endocyt_degrad | excitatory |
| raccdc42 | mekk1 | excitatory |
| raccdc42 | mekk4 | excitatory |
| raccdc42 | mlk3 | excitatory |
| raccdc42 | pak1 | excitatory |

TABLE 2B-continued

| Source Node | Target Node | Relationship type |
|---|---|---|
| raf1 | mek12 | excitatory |
| ras | pi3k | excitatory |
| ras | raf1 | excitatory |
| ras | rin1 | excitatory |
| rasgap | ras | inhibitory |
| rheb | mtor_rap | excitatory |
| rin1 | rab5a | excitatory |
| rntre | rab5a | inhibitory |
| shc | grb2 | excitatory |
| ship2 | ship2d | excitatory |
| ship2d | pi34p2 | excitatory |
| ship2d | pip3 | inhibitory |
| shp1 | shp1d | excitatory |
| shp1d | erbb11 | inhibitory |
| shp1d | erbb12 | inhibitory |
| shp1d | erbb13 | inhibitory |
| shp1d | erbb14 | inhibitory |
| shp2 | rasgap | inhibitory |
| sos1 | ras | excitatory |
| sos1eps8e3b1 | raccdc42 | excitatory |
| sos1r | sos1 | excitatory |
| sos1r | sos1eps8e3b1 | excitatory |
| tgfa | erbb11 | excitatory |
| tgfa | erbb12 | excitatory |
| tgfa | erbb13 | excitatory |
| tgfa | erbb14 | excitatory |
| tgfa | erbb24 | excitatory |
| tsc1_tsc2 | rheb | inhibitory |
| vav2 | raccdc42 | excitatory |

Biological: Network Example 3: PIM

The biological network associated with the molecular sub-type PIM represents the biological process of apoptosis and proliferation. In this example, the biological network is made up of 30 nodes. These 30 nodes, and the corresponding associated genes, are shown in table 3A below.

TABLE 3A

| Node | Genes |
|---|---|
| Akt | AKT1, AKT2 |
| Apoptosis | |
| BCR | BCR |
| Bad | BAD |
| Chk | CHKA |
| EBP1 | PA2G4 |
| EIF3 | EIF3A |
| EIF4B | EIF4B |
| EIF4E | EIF4E |
| ERK | MAPK3, MAPK1 |
| FGFR1JAK2 | FGFR1, JAK2 |
| Grb2SOS | GRB2, SOS1 |
| H3 | HIST1H3A |
| MEK | MAP2K1 |
| PDGFRA | PDGFRA |
| PI3K | PIK3CA |
| PIM1 | PIM1 |
| PIM2 | PIM2 |
| PRAS40 | AKT1S1 |
| Proliferation | |
| RSK | RPS6KA1, RPS6KA2, RPS6KA3 |
| Raf | RAF1 |
| Ras | HRAS |
| S6 | RPS6 |
| TSC2 | TSC2 |
| TYK2 | TYK2 |
| cMyc | MYC |
| mTORC1 | MTOR |
| mTORC2 | MTOR |
| p27 | CDKN1B |

The 66 relationships between nodes (relationships from a source node to a target node) are shown in table 3B below.

TABLE 3B

| Source Node | Target Node | Relationship type |
|---|---|---|
| EIF4E | Apoptosis | inhibitory |
| S6 | Apoptosis | inhibitory |
| RSK | Proliferation | excitatory |
| ERK | Proliferation | excitatory |
| Bad | Apoptosis | inhibitory |
| cMyc | Proliferation | excitatory |
| PIM1 | cMyc | excitatory |
| PIM2 | cMyc | excitatory |
| H3 | cMyc | excitatory |
| PIM2 | p27 | excitatory |
| PIM1 | p27 | excitatory |
| p27 | Proliferation | excitatory |
| mTORC1 | EBP1 | excitatory |
| mTORC1 | S6 | excitatory |
| cMyc | Apoptosis | inhibitory |
| S6 | EIF4E | excitatory |
| EBP1 | EIF4E | excitatory |
| EIF3 | S6 | excitatory |
| EIF3 | EBP1 | excitatory |
| mTORC2 | Akt | excitatory |
| TSC2 | mTORC1 | excitatory |
| Akt | TSC2 | excitatory |
| S6 | MEK | inhibitory |
| MEK | ERK | excitatory |
| BCR | Grb2SOS | excitatory |
| BCR | Ras | excitatory |
| Ras | Raf | excitatory |
| Raf | MEK | excitatory |
| BCR | PI3K | excitatory |
| TSC2 | mTORC2 | inhibitory |
| ERK | RSK | excitatory |
| PI3K | Akt | excitatory |
| RSK | TSC2 | inhibitory |
| ERK | TSC2 | inhibitory |
| EIF4E | EIF3 | excitatory |
| PIM1 | PRAS40 | excitatory |
| Raf | Bad | excitatory |
| RSK | Bad | excitatory |
| PIM2 | TSC2 | excitatory |
| PRAS40 | Akt | inhibitory |
| PIM1 | Chk | excitatory |
| Chk | H3 | excitatory |
| PIM2 | Chk | excitatory |
| Grb2SOS | Ras | excitatory |
| PI3K | mTORC2 | excitatory |
| RSK | S6 | excitatory |
| Akt | PRAS40 | excitatory |
| TYK2 | PIM1 | excitatory |
| PRAS40 | mTORC1 | excitatory |
| PIM1 | EIF4B | excitatory |
| EIF4B | EIF3 | excitatory |
| EIF4B | Proliferation | excitatory |
| PIM2 | EBP1 | excitatory |
| RSK | EIF4B | excitatory |
| TYK2 | PIM2 | excitatory |
| FGFR1JAK2 | Grb2SOS | excitatory |
| PDGFRA | PI3K | excitatory |
| PDGFRA | PIM1 | excitatory |
| PDGFRA | PIM2 | excitatory |
| PDGFRA | ERK | excitatory |
| Grb2S0S | PI3K | excitatory |
| FGFR1JAK2 | PIM1 | excitatory |
| PIM1 | Bad | excitatory |
| FGFR1JAK2 | cMyc | excitatory |
| FGFR1JAK2 | Apoptosis | excitatory |
| cMyc | p27 | excitatory |

Three calculation examples of the aggressiveness score and the determination of risk groups and survival prognosis are reported below, obtained by applying the method of the invention, based on an experimental data set.

In the three cases, a total of 1904 breast cancer cases with mRNA expression data obtained from the METABRIC data set through the "cBioPortal for Cancer Genomics" were used as the experimental database (i.e., clinical data).

First Example

The calculation of the aggressiveness score, the determination of the risk groups and survival prognosis are in this case carried out on tumor samples of the molecular sub-type "Luminal B".

A total of 461 samples (of the aforementioned total of 1904 samples of the METABRIC data set) were classified as belonging to the molecular sub-type "Luminal B", based on the PAM50 classification data comprised in the aforesaid METABRIC data set.

In accordance with an embodiment of the method, the procedure was carried out according to the following steps:
1. Choice of the PIM-type biological network (see tables 3A and 3B above), considered relevant for the aforesaid tumor sub-type.
2. Binarization of the data set at the node level using the free energy methodology.
3. Calculation of the aggressiveness score through the energy of the samples.
4. Determination, based on the calculated aggressiveness score, of the risk groups, defined by quantile values of 5% and 10%.

The results obtained (summarized in the diagram in FIG. 1) show a 5-year survival probability of 88% for the low risk group and 74% for the high risk group.

Second Example

The calculation of the aggressiveness score, the determination of the risk groups and survival prognosis are in this case carried out on tumor samples of the molecular sub-type "HER2".

A total of 220 samples (of the aforementioned total of 1904 samples of the METABRIC data set) were classified as belonging to the molecular sub-type "HER2", based on the PAM50 classification data comprised in the aforesaid METABRIC data set.

In accordance with an embodiment of the method, the procedure was carried out according to the following steps:
1. Choice of the EMT-MET-type biological network (see tables 1A and 1B above), considered relevant for the aforesaid tumor sub-type.
2. Binarization of the data set at the node level using the Gaussian mixture methodology.
3. Calculation of the aggressiveness score through the out-of-balance variable.
4. Determination, based on the calculated aggressiveness score, of the risk groups, defined by quantile values of 20%.

The results obtained (summarized in the diagram in FIG. 2) show a 5-year survival probability of 76% for the low risk group and 51% for the high risk group.

Third Example

The calculation of the aggressiveness score, the determination of the risk groups and survival prognosis are in this case carried out on tumor samples of the molecular sub-type "triple negative".

A total of 398 samples (of the aforementioned total of 1904 samples of the METABRIC data set) were classified as belonging to the molecular sub-type "triple negative", based on the PAM50 classification data comprised in the aforesaid METABRIC data set.

In accordance with an embodiment of the method, the procedure was carried out according to the following steps:
1. Choice of the EMT-MET-type biological network (see tables 1A and 1B above), considered relevant for the aforesaid tumor sub-type.
2. Binarization of the data set at the node level using the free energy binarization methodology.
3. Calculation of the aggressiveness score using the "First Principal Component" methodology.
4. Determination, based on the calculated aggressiveness score, of the risk groups, defined by quantile values of 10%.

The results obtained (summarized in the diagram in FIG. 3) show a 5-year survival probability of 87% for the low risk group and 56% for the high risk group.

Figure 2:
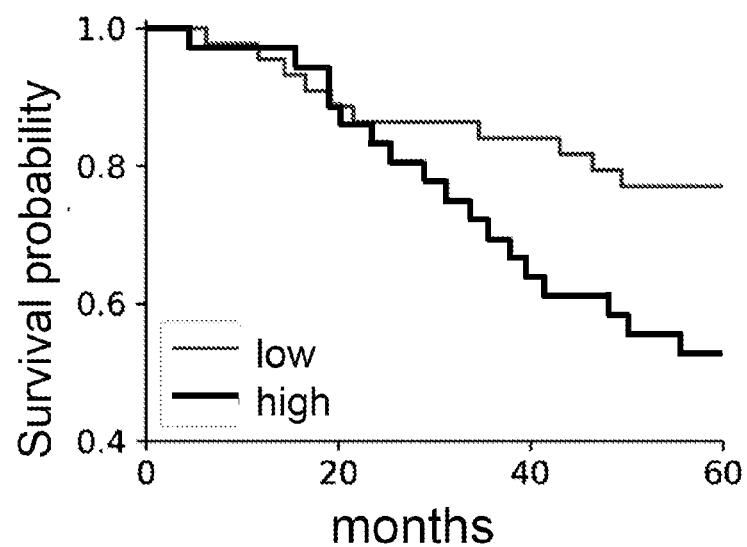
Figure 3:
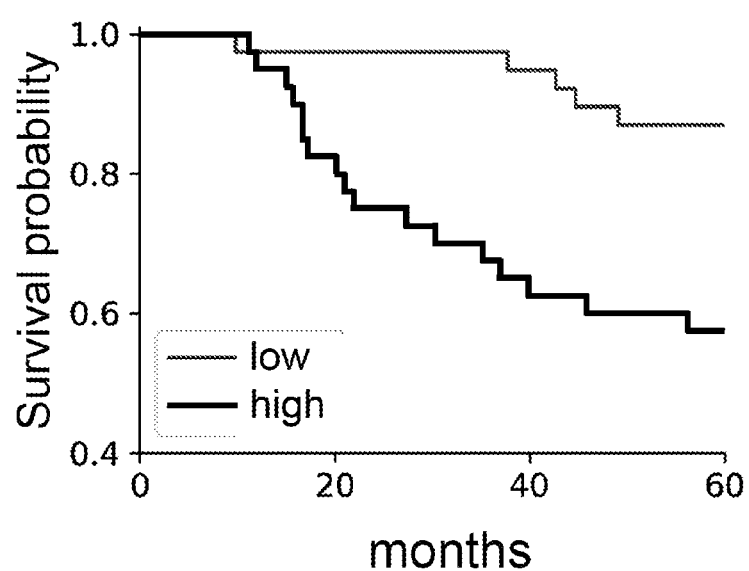

It should be noted that FIGS. 1, 2, 3 depict diagrams showing the survival probabilities predicted by the method. The fact that the samples classified as high risk are associated with curves with lower survival probability, for the same time period considered, compared to samples classified as low risk is an indication of the effectiveness of the algorithm based on the aggressiveness score calculated by the method, and of the consistency of the predictive results obtained.

Furthermore, in all three cases, the survival probabilities obtained were found to be close to the real survival rates found in the experimental data sets.

Further details on a further embodiment of the method are provided below.

The first step of this embodiment of the method is the choice of a relevant biological network. This choice depends on the molecular sub-type of the tumor samples analyzed, since different sub-types of breast cancer have different features.

The choice of an appropriate biological network allows to focus on the relevant biological interactions, represented by activation (or excitation) and inhibition relationships in the network.

Each node of the network can be associated with one or more genes, of which a continuous expression value is calculated at the node level.

The second step of this embodiment of the method is the binarization of the expression data at the node level. Binary data encodes information using only two values, such as −1 to represent a low expression and +1 to represent a high expression.

Correct placement of the threshold between what is considered "low expression" and what is considered "high expression" is of crucial importance, and is particularly difficult in cases where most samples have high expressions or low expressions (unbalanced data). In this situation, standard binarization methods provide unsatisfactory results.

Advantageously, the present method includes for this purpose the binarization methodology based on free energy, which allows to identify a correct boundary (i.e., a threshold) even in significantly unbalanced data sets.

At this point in the method, a binary data set is available at node level.

The third step of the method is the calculation of the aggressiveness parameter, i.e., the calculation of a value of this parameter, a value which can also be defined as the "aggressiveness score".

The "aggressiveness score" is a numerical value assigned to each sample, which predicts long-term survival and is then used to define high or low risk groups.

The "aggressiveness score" can be calculated in different ways, and the choice depends, also in this case, on the molecular sub-type of tumor considered.

Some choices use simulated samples which represent the possible cellular states encoded (i.e., described) by the biological network, and are obtained by computer simulation of so-called Boolean models.

At the end of the third step, an "aggressiveness score" is available for each sample.

The fourth and final step of this embodiment of the method is assigning the samples to one of two groups, high risk and low risk. This is done by sorting the samples based on the "aggressiveness score" thereof and then using a higher quantile value above which the samples are classified high risk, and a lower quantile value below which the samples are classified low risk. Once this classification has been made, a personalized report can be generated for the patient, containing the value of the aggressiveness parameter, the corresponding risk group and possibly other information.

As can be seen, the objects of the present invention, as previously indicated, are fully achieved by the method described above, by virtue of the features illustrated above in detail.

In particular, the method illustrated here identifies as a crucial step for the predictive prognosis the calculation of an aggressiveness parameter (i.e., aggressiveness score) based on a biological network (regulatory network) representative of a particular biological process associated with breast tumors and the expression mapping of the genes of the network on the possible states of a Boolean model of the biological network.

Thereby, the solution shown here clearly differs from known solutions which perform predictions based on a limited set of predefined genes, generically associated with the presence of a tumor.

To the embodiments of the method described above, a person skilled in the art may, in order to meet contingent needs, make modifications, adaptations and substitutions of elements with other functionally equivalent ones without departing from the scope of the following claims. All the features described above as belonging to a possible embodiment may be implemented irrespective of the other embodiments described.

The invention claimed is:

1. A method for determining a survival prognosis of a patient suffering from a breast tumor, using processing carried out by electronic processing and/or calculation means, said method comprising the steps of:
   (a) defining a biological network representative of a particular biological process associated with the breast tumor,
   said biological network comprising a plurality of nodes, a set of directional relationships between said nodes and a set of genes associated with said nodes,
   wherein each node represents a gene and/or a protein and/or a complex of multiple proteins and/or another molecule and/or an ion present in a cell or in contact therewith and/or a particular external condition to which the cell is subjected and/or states in which the cell can be found,
   wherein each directional relationship is defined by a source node, a target node and an interaction type, and in which the interaction type comprises inhibition interaction, in an inhibition relationship, or excitation interaction, in an excitation relationship, or absence of interaction, said directional relationship being determined from the source node to the target node;
   (b) accessing a patient-related data set, said data set comprising expressions of genes in a biological sample of said tumor isolated from the patient;
   (c) calculating a continuous expression value for said nodes of the biological network, wherein said calculation step comprises:
   if the node is associated with only one gene and if, based on said patient data set, it is found that the gene is present in the biological sample, calculating the continuous expression value of the node as the expression of the associated gene detected in the biological sample;
   if the node is associated with multiple genes, and if, based on said patient data set, it is found that at least one of said genes is present in the biological sample, calculating the continuous expression value of the node based on the expressions of the associated genes, which are present in the biological sample;
   if the node is not associated with any gene, or if, based on said patient data set, the associated gene is not found in the biological sample, marking the node as a node not associated with a continuous expression value;
   (d) carrying out, by said electronic processing and/or calculation means, a binarization of the data set of continuous expression values calculated for each node of the biological network with which a continuous expression value is associated, based on a comparison of the continuous expression value to a respective threshold, in order to obtain a first binarized data set of the nodes, obtained on the basis of said calculating step (c);
   (e) calculating, by said electronic processing and/or calculation means, an aggressiveness score, derivable from the first binarized data set of the nodes, based on said first binarized data set of the nodes; and
   (f) determining a result of the survival prognosis based on said calculated aggressiveness score,
   wherein step (e) of calculating an aggressiveness score comprises calculating the aggressiveness score as the energy of the patient's biological sample and/or the fraction of the out-of-balance nodes of the patient's biological sample and/or based on a projection of the data set on the main component thereof through a Principal Component Analysis methodology and/or based on a projection of the data set on a simulated binarized data set first principal component, through a Principal Component Analysis methodology,
   wherein the step (e) of calculating an aggressiveness score further comprises:
   simulating, through computational simulation, the biological network, through simulated samples which represent possible cellular states described by the biological network, in order to obtain a simulated binarized data set; and
   defining the aggressiveness score based on a projection of the data set on the simulated binary data set first principal component, through a Principal Component Analysis methodology, and
   wherein said step of simulating the biological network comprises:
   numerically calculating the state of the biological network from a certain initial condition chosen randomly;

updating, by means of a simulation algorithm, the binarized value of each node, in a sequential manner, changing the state thereof so that there is an increase in the number of satisfied directional relationships among the directional relationships of which said node is the target; and iterating said updating step, until a steady state of the biological network is achieved, in which each node is in a binary state which satisfies the majority of the directional relationships of which said node is the target, wherein said steady state corresponds to a possible state of the cell.

2. A method according to claim 1, wherein step (f) of determining a survival prognosis result comprises calculating an estimated survival probability based on the calculated aggressiveness score.

3. A method according to claim 2, wherein the step of calculating the estimated survival probability comprises calculating the estimated survival probability based on the aggressiveness score,
wherein a relationship between the estimated survival probability and the aggressiveness score is predetermined based on experimental data,
or wherein said relationship is obtained by processing with one or more trained predictive algorithms, wherein the one or more trained algorithms comprise machine learning algorithms, and wherein the training step is carried out on an available experimental data set, which are partitioned into a test set and a training set.

4. A method according to claim 2, wherein the step of calculating an estimated survival probability comprises calculating the estimated survival probability as a function of time,
wherein the step of calculating an estimated probability further comprises:
classifying the patient into a high risk group or a low risk group, wherein the high and low risk groups are defined with respect to a lower quantile value threshold or a higher quantile value threshold of the survival probability distribution with respect to the aggressiveness score values;
assigning to the patient a probability prospect associated with the group to which the patient belongs, in which the patient was classified, said probability prospect associated with the group to which the patient belongs for each of the high-risk and low-risk groups being calculated upstream in a training step, based on experimental data.

5. A method according to claim 4, further comprising the step of providing the patient with a personalized report, containing the calculated aggressiveness score value and/or the determined risk group to which the patient belongs.

6. A method according to claim 1, adapted to determine a survival prognosis of a patient suffering from a specific molecular sub-type of breast tumor, wherein step (a) of defining comprises:
(a) defining, based on known medical/biological knowledge related to said molecular sub-type of breast tumor, a biological network representative of a particular biological process associated with the molecular sub-type of tumor.

7. A method according to claim 1, wherein the step (c) of calculating the continuous expression value of the node, if the node is associated with multiple genes, comprises calculating the continuous expression value of the node as the maximum value among the expression values of the associated genes, or as the minimum value among the expression values of the associated genes, or as the average of the expression values of the associated genes.

8. A method according to claim 1, further comprising a step (g) of defining, for each node with which a continuous expression value is associated, a respective threshold, and attributing to the node a first binary value, if the continuous expression value of the node is less than said respective threshold, and a second binary value, if the continuous expression value of the node is greater than said respective threshold.

9. A method according to claim 8, wherein the first binary value is −1 and the second binary value is +1.

10. A method according to claim 8, adapted to determine a survival prognosis of a patient suffering from a specific molecular sub-type of breast tumor, wherein step (a) of defining comprises:
(a) defining, based on known medical/biological knowledge related to said molecular sub-type of breast tumor, a biological network representative of a particular biological process associated with the molecular sub-type of tumor, and
wherein the step (g) of predefining the threshold comprises defining the threshold based on a preliminary processing carried out on a set of available experimental data related to a plurality of tumor samples of the particular molecular sub-type considered, from patients whose clinical history and survival time are known.

11. A method according to claim 10, wherein the step of defining the threshold comprises defining the threshold based on machine learning algorithms using available experimental data sets of patients, whose clinical history is known,
and/or wherein the step of defining a threshold comprises defining the threshold based on a methodology based on Gaussian kernels or based on the average expression.

12. A method according to claim 10, wherein the step of defining the threshold comprises defining the threshold based on a free energy binarization methodology,
wherein said free energy binarization methodology comprises calculating the threshold based on a minimization of the difference between the average energy of all the samples, belonging to said plurality of samples associated with the available experimental data set, and the sum of the entropy of all the nodes of the biological network multiplied by a correction parameter.

13. A method according to claim 1, wherein the step (e) of calculating an aggressiveness score comprises calculating the aggressiveness score in a plurality of said methodologies, and the method further comprises:
carrying out a plurality of instances of the method according to claim 1, using a respective aggressiveness score, among the aggressiveness scores calculated according to a respective methodology of the aforementioned calculation methodologies, on each of the cases of an experimental database of cases of patients affected by a specific molecular sub-type of breast tumor, the prognosis of which is known;
selecting, for the molecular sub-type of tumor considered, the calculation methodology which provides the most accurate prediction;
validating the selected calculation methodology on a further experimental data set of cases the prognosis of which is known, independent of said experimental database, to avoid "overfitting".

14. A method according to claim 1, wherein the step (e) of calculating an aggressiveness score comprises calculating the aggressiveness score as the energy of the patient's biological sample, defined as the number of relationships satisfied in the respective biological network minus the number of unsatisfied relationships in the respective biological network, wherein a satisfied relationship is defined as an excitation relationship in which the source node and the target node take the same value, or as an inhibition relationship in which the source node and the target node take different values, and wherein an unsatisfied relationship is defined as an excitation relationship in which the source node and the target node take different values, or an inhibition relationship in which the source node and the target node take the same value.

15. A method according to claim 1, wherein the step (e) of calculating an aggressiveness score comprises calculating the aggressiveness score as the fraction of out-of-balance nodes of the patient's biological sample, wherein the fraction of out-of-balance nodes is defined as the number of out-of-balance nodes divided by the total number of nodes in the biological network.

16. A method according to claim 1, wherein the step (e) of calculating an aggressiveness score comprises calculating the aggressiveness score based on a projection of the data set on the principal component thereof through a Principal Component Analysis methodology.

17. A method according to claim 1, wherein said steps of numerically calculating, updating, and iterating are repeated several times, with different initial conditions, to represent a plurality of potential states in which the cell can be found.

* * * * *